United Stat

Wallshein

Re. 28,962 ssued Sept. 14, 1976

[54] BUCCAL END TUBE

[76] Inventor: Melvin Wallshein, 8645 Bay Parkway, Brooklyn, N.Y. 11214

[22] Filed: June 9, 1975

[21] Appl. No.: 584,752

Related U.S. Patent Documents

Reissue of:

[64] Patent No.: 3,874,080
Issued: Apr. 1, 1975
Appl. No.: 337,897
Filed: Mar. 5, 1973

[52] U.S. Cl. ..... 32/14 A
[51] Int. Cl.[2] ..... A61C 7/00
[58] Field of Search ..... 32/14 A

[56] References Cited

UNITED STATES PATENTS

| | | | |
|---|---|---|---|
| 2,915,824 | 12/1959 | Kesling | 32/14 A |
| 2,958,945 | 11/1960 | Waldman | 32/14 A |
| 3,218,713 | 11/1965 | Wallshein | 32/14 A |
| 3,218,715 | 11/1965 | Wallshein | 32/14 A |
| 3,639,986 | 2/1972 | Kesling | 32/14 A |
| 3,729,826 | 5/1973 | Kesling | 32/14 A |
| 3,775,850 | 12/1973 | Northcutt | 32/14 A |

*Primary Examiner*—Louis G. Mancene
*Assistant Examiner*—Jack Q. Lever
*Attorney, Agent, or Firm*—Flynn & Frishauf

[57] ABSTRACT

Two spaced substantially parallel tabs are supported on a mounting portion which may be in the form of a welding flange connectable to a tooth band. According to the presently preferred embodiment, each of the tabs is provided with a plurality of apertures. At least the wire receiving ends of the apertures are tapered to facilitate location and entry of the arch wire into the respective apertures. By selectively passing the arch wire through preselected apertures, the wire can either be passively positioned in the buccal end tube device wherein it does not exert any forces on the tooth or, alternately, it can engage the device actively wherein rotating as well as tipping forces can be applied to the tooth on which the end tube device is mounted. An end tube device is also described wherein a buccal tube is mounted adjacently to the end tube device and is provided with a slot through which an arch wire can pass interiorly of the tube. When so used, the buccal tube replaces one of the apertured tabs and offers greater versitility for applying forces to the tooth than provided by the two apertured tabs.

23 Claims, 8 Drawing Figures

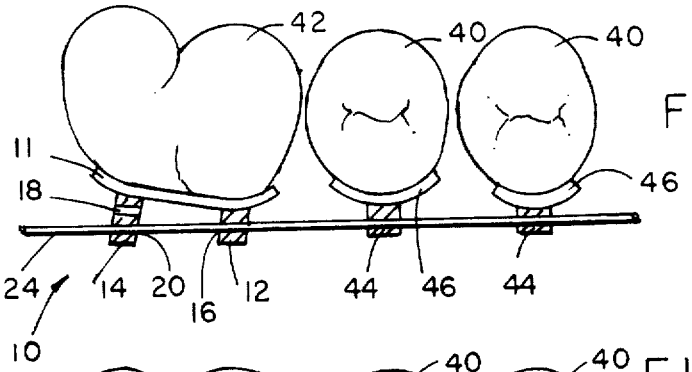
FIG. 4.
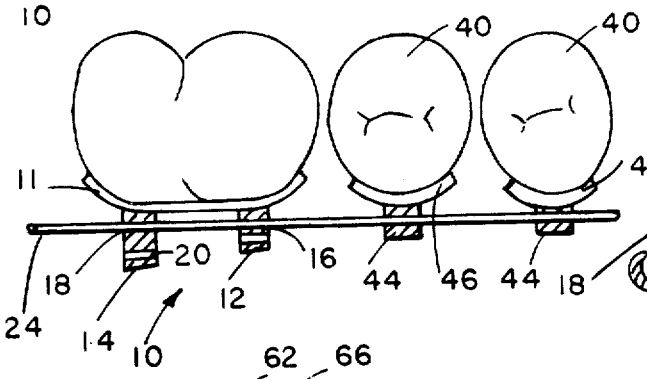
FIG. 5.
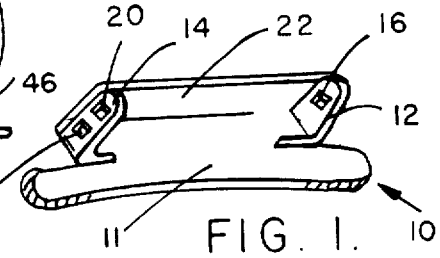
FIG. 1.
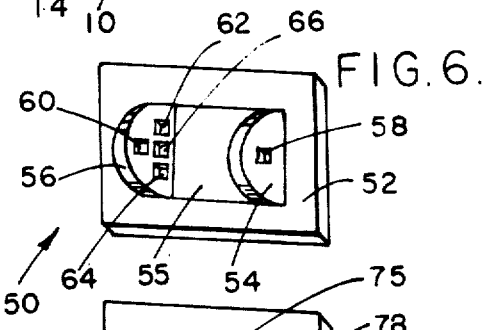
FIG. 6.
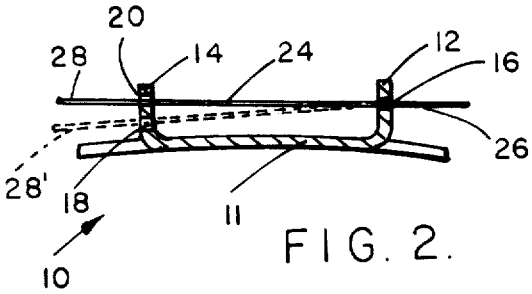
FIG. 2.
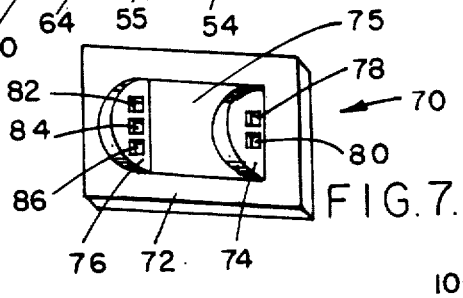
FIG. 7.
FIG. 8.
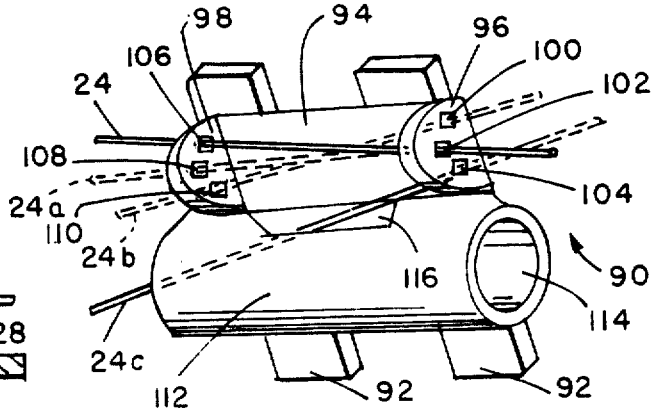
FIG. 3.
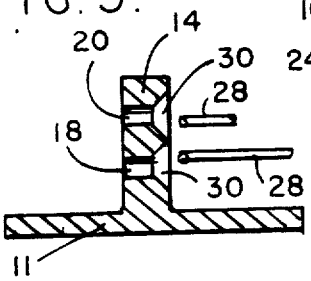

BUCCAL END TUBE

Matter enclosed in heavy brackets [ ] appears in the original patent but forms no part of this reissue specification; matter printed in italics indicates the additions made by reissue.

BACKGROUND OF THE INVENTION

The present invention generally relates to orthodontic appliances, and more particularly to a buccal end tube device for selectively orienting an orthodontic arch wire relative to a tooth.

Various buccal tubes or end tubes are already known which are positioned on a tooth to receive the end of an arch wire of an orthodontic arch. The buccal tubes are usually placed on one of the molar teeth. As is well known in the art, the section of the arch which extends between the cuspids to the first molars is generally straight. However, depending on the precise position in which the buccal tube is mounted on the buccal surface of the molar, the axis of the aperture through the buccal tube will vary relative to the straight line arch wire section which extends distally towards the molars. Normally, the buccal tube is so mounted on a normally positioned molar so that it has a distinguished inclination relative to the undeflected arch wire extension. Forcing the arch wire extension through the buccal tube, in such a case, causes the molar on which the buccal tube is mounted to rotate mesiolingually or distobuccally. When the molar is oriented in a desired position, however, such rotation is undesirable and, ideally, the arch wire extension only passes through the buccal tube in a passive state without generating forces on the tube. Such passive relationship between the arch wire extension and the buccal tube can sometimes be achieved by precise positioning of the buccal tube so that its axis is substantially aligned with the axis of the undeflected arch wire extension. There have been numerous problems in the mounting of buccal tubes. Firstly, it is not always possible or practical to precisely mount the buccal tubes in such a manner that their axis will align with the axis of the undeflected arch wire extension. Frequently, a technician welds the tube inadvertently on a slightly offset buccal surface from that surface which would provide such coaxial alignment. Depending where the buccal tube is welded on a tooth band, if any misalignment results, the molar tooth on which the tube is mounted will either be forced to rotate distobuccally or distolingually, mesiolingually, or mesiobuccally.

One approach which has been taken to achieve alignment in some cases has been the bending of the arch wire lingually so as to change the orientation of the axis of the arch wire extension to coincide with the previously welded or positioned end tube or buccal tube. Very careful attention must be given to the manner in which molar bends are formed, because the previously mentioned straight line from cuspid to molar ends at the molar. If the buccal surface of the molar follows the same straight line, the tooth would be rotated distobuccally. For example, a simple bend may be proper over the mesiobuccal molar cusp, but a double bend or bayonet bend is required if the bend is positioned more mesially. The utilization of the bends in the arch wire extensions to provide alignment presents a second problem known in the prior art which arises when the arch wires move with the movement of teeth during corrective action. Thus, while a bent arch wire extension may initially provide passive engagement with an end tube, movement of the arch wire relative to the end tube may generate the very rotating forces which intended to be avoided by the application of the bends. Furthermore, excessive movement of either the arch wire or of the tooth on which end tube is mounted may result in undesired engagement between the end tube and the bend whereby further movement of one is prevented by the other of the engaging elements.

Although passive engagement is frequently desired at the end tubes, it is sometimes desired to rotate the molar either distobuccally or distolingually when a molar is not in its desired position. In such cases, the axis of an arch wire extension must be engaged with a properly mounted end tube whose aperture axis forms a predetermined or desired angle relative to the axis of the arch wire extension. Most buccal tubes known in the art provide apertures parallel with the welding flange, thereby forming no angle therewith. Some buccal tubes are provided with a 5° angle relative to the welding flange. Such angled tubes are utilized for distolingual rotation to essentially counteract the distobuccal or mesiolingual rotation associated with normally positioned molars and straight wire extensions described above.

The buccal tubes, either with 0° or 5° offsets, have not, however, offered the flexibility required in the utilization of buccal tubes. If another inclination or offset is desired, this is not possible except by removing the end tube from the band and reconnecting it on another buccal surface thereof. The latter approach is very time consuming and cumbersome both to the technician as well as to a patient. It also frequently happens that the desired orientation of the end tube aperture changes as the teeth move in response to the forces generated by the arch. Clearly, the prior art end tubes do not permit changes in the angular orientation of the end tubes without removing the latter and repositioning it.

Another feature of the known end tubes has been that they have normally been used merely for the purpose of preventing rotation of a molar tooth in one direction or another. The known types of end tubes do not permit convenient orientation of the arch wire therethrough which would result or cause the molar to selectively tip or rotate in one direction or another. To achive such corrective action, the end tube must be previously welded to a band in the precisely desired fashion. As in the case of rotation, the number of inclinations available for inserting an arch wire extension for tipping purposes is severely limited.

SUMMARY OF THE INVENTION

Accordingly, it is an object of the present invention to provide a buccal end tube device which is not possessed of the disadvantages associated with prior art buccal or end tubes.

It is another object of the present invention for providing a buccal end tube device which is simple in construction and economical to manufacture.

It is still another object of the present invention to provide a buccal end tube device which provides flexibility in angular orientations which an arch wire extension may be given without repositioning the end tube device.

It is yet another object of the present invention to provide a buccal end tube device which includes a plurality of apertures through which an arch wire extension may selectively pass.

It is a further object of the present invention to provide a buccal end tube device which provides flexibility insofar as providing possible angular inclinations of an arch wire extension for purposes of tipping a tooth.

It is still a further object of the present invention to provide a buccal end tube device which permits passive engagement of an arch wire extension therethrough irrespective of the specific location of the band on which the device is mounted.

It is yet a further object of the present invention to provide a buccal end tube device which may be engaged actively or passively by an arch wire extension and which does not necessitate bends in the arch wire for purposes of obtaining such engagement.

It is an additional object of the present invention to provide a buccal end tube device which cooperates with a slotted buccal or extra-oral tube which can laterally receive an arch wire extension for increasing the number of angular orientations which the arch wire extension may be given for purposes of tipping a tooth.

It is still an additional object of the present invention to provide a buccal end tube device which comprises two spaced apertured tabs, the space between the tabs being freely accessible for facilitating the location and entry of the arch wire extension through preselected apertures.

It is yet an additional object of the present invention to provide apertures having tapered end portions which are arranged to first receive the arch wires passing through the apertures for facilitating location and entry therethrough.

In order to achieve the above objects, as well as others which will become apparent hereafter, a buccal end tube device for selectively orienting an orthodontic arch wire relative to a tooth comprises two spaced arch wire positioning members. One of said members is provided with first arch wire positioning means for positioning a first portion of an arch wire and the other of said members is provided with second arch wire positioning means for selectively positioning a second portion of the arch wire in one of at least two positions relative to the position of said first arch wire portion. In this manner, the arch wire may be selectively oriented by selectively positioning the second arch wire portion in the desired one of said at least two positions.

In accordance with the presently preferred embodiment, each of said first and second positioning members are in the form of apertured tabs which are connected by a substantially flat elongated strip adapted to be mounted on a band or tooth. The apertures are so positioned on said tabs so that a wire passing through selected aperture in each of said tabs causes said wire to be directed in preselected orientations relative to the tooth on which the device is mounted. At least two apertures, one in each tab, are so provided so that an arch wire extension may pass therethrough and be placed in a passive state with respect to the device. Rows of such apertures may be spaced from each other in lingual or buccal directions for permitting an arch wire extension to pass through selected apertures in order to generate rotating and/or tipping forces.

According to another embodiment of the present invention, an extra-oral end tube is mounted adjacent to the apertured tabs. A portion of the periphery of the tube is disposed adjacent to the tabs and is provided with a longitudinal slot substantially extending along the length between the apertured tabs. The slot is arranged to receive an arch wire which passes through only one of said apertured tabs. In this manner, said dots in said extra-oral device or tube can be utilized in place of one of said apertured portions.

BRIEF DESCRIPTION OF THE DRAWINGS

With the above and additional objects and advantages in view, as will hereinafter appear, this invention comprises the devices, combinations and arrangements of parts hereinafter described and illustrated in the accompanying drawings of a preferred embodiment in which:

FIG. 1 is a perspective view of a buccal edgewise device in accordance with the present invention, showing one apertured tab with two apertures and another spaced apertured tab with one aperture;

FIG. 2 is a bottom view, in cross-section of the device as shown in FIG. 1, and further showing an arch wire passing through the apertures in both a passive as well as in an active condition or state;

FIG. 3 is a fragmented enlarged portion of one of the tabs of the device shown in FIG. 2, showing the details of the apertures;

FIG. 4 is a top plan view of the bicuspids and the first molar of the lower dental arch with a wire passing through a buccal end tube device as shown in FIG. 1 mounted on the first molar tooth, the arch wire passing through the device passively through selected apertures in the two tabs;

FIG. 5 is similar to FIG. 4 wherein the first molar is rotated distobuccally, the arch wire again passing passively through the device through other selected apertures in the tabs of the edgewise device;

FIG. 6 is a perspective view of another embodiment of the edgewise device in accordance with the present invention, showing four apertures in one of the tabs and one aperture in the other spaced tab;

FIG. 7 is a perspective view of a buccal end tube device similar to that shown in FIG. 6, but with three apertures in one of the tabs and two apertures in the other of the spaced tabs; and FIG. 8 is a perspective view of a buccal end tube device similar to that shown in FIGS. 6 and 7, but further including an extra-oral tube connected to the end tube device, the extra-oral tube being provided with a longitudinal peripheral slot which is suitable for receiving arch wire extensions instead of passing through one of the apertured tabs.

DETAILED DESCRIPTION OF THE PREFERRED EMBODIMENTS

Referring now to the Figures, in which like or identical parts have been designated by the same reference numbers, and first referring to FIG. 1, a buccal end tube device, in accordance with the present invention is generally designated by the reference numeral 10. The device 10 includes a substantially flat strip in the form of a welding flange 11 which may be of conventional design. Positioned at the opposite ends of the welding flange 11 are arch wire positioning members in the form of tabs 12, 14. Each tab has a predetermined edge contour. In the preferred embodiment, the tabs are integral with the welding flange 11 and are bent relative to the latter so as to project substantially normally to the plane of the welding flange 11. Although the tabs are advantageously integral with the welding flange or mounting member, it should be clear that this is not a critical requirement and the tabs may be originally separate members which are connected to a welding flange in any conventional manner.

The specific orientations and directions of the buccal devices to be described in accordance with the preferred embodiments are merely illustrative. It should become apparent from the following description that the buccal end tube devices may be somewhat modified by those skilled in the art so that they may be used in corresponding manners in connection with the upper or lower teeth.

The tab 12, on the mesial end of the end tube device of the embodiment being described, is provided with arch wire positioning means in the form of a single aperture 16. Similarly, the tab 14 on the distal end of the device, is provided with arch wire positioning means in the form of two spaced apertures 18, 20. The apertures are fully contained within the respective edge contours of the tabs. The apertures 18, 20 are spaced from each other in a lingual direction when mounted on a buccal surface of a molar tooth. The apertures 18, 20 are provided for selectively positioning a portion of an arch wire passing therethrough in at least one of two positions relative to another arch wire portion which is positioned by the aperture 16. In this manner, the arch wire may be selectively oriented by selectively positioning the arch wire portion in the tab 14 in one of the two positions offered by the apertures 18, 20. This selective orientation is illustrated in FIG. 2 wherein an arch wire portion 26 is positioned within the aperture 16 while another arch wire portion 28 is positioned in the aperture 20. When the arch wire 24 passes through the apertures 16 and 20, the arch wire assumes a straight or unflexed state. Accordingly, the arch wire 24 is passive insofar as the end tube device 10 is concerned and does not apply any forces thereto. Such would be the selection of the apertures when the device 10 is mounted on a tooth which is in its desired position and no rotation or tipping of the tooth is deemed necessary.

The arch wire 24 is shown in dashed outline in FIG. 2, wherein it passes through the apertures 6 and 18. In this condition, the arch wire 24 assumes a flexed stressed state and applies rotating forces to the end tube device 10 so as to rotate the tooth misiolingually or distobuccally. It should be clear that the provision of a third aperture in the tab 14 spaced facially from the aperture 20 could reverse the direction if the arch wire 24 is made to pass through the aperture 16 and that further facially spaced aperture. In such a case, the tooth would be rotated distolingually.

In FIG. 3, the presently preferred aperture configurations are shown. Thus, the tab 14 generally defines, when mounted on a tooth, distal and mesial surfaces. Since an arch wire 28 normally enters the tab 14 through the mesial surface, each of the apertures 18, 20 is provided with a conical or prismatic taper 30 at the mesial end of the aperture. These conical or prismatic tapered portions of the apertures facilitate the location and entry of the arch wire 28 through the apertures. It should be clear that the conical or prismatic tapers 30 should at least be provided on the mesial ends of the apertures of the distal tab 14. However, such tapered portions may also be provided on the mesial ends of the apertures provided in the mesially positioned tab 12. In order to permit the reversal of the mesial and distal tabs 12, 14, tapers may be provided, in each tab, at the end of each aperture.

The conical or prismatic tapers 30 are especially helpful when an arch wire is desired to pass through the device and be engaged therewith in a passive state. To obtain such a passive relationship, it is only necessary to first pass the arch wire through an aperture in the mesially spaced tab, e.g. tab 12, and advance the arch wire while permitting the end arch wire portion 28 to freely select an aperture in the distally spaced tab, e.g. tab 14. Such natural selection by the arch wire automatically provides the angular orientation which is the least active. Stated in another way, by freely letting the arch wire end portion 28 select one of the apertures in the distally spaced tab, an orientation of the arch wire 24 will be provided which is the most passive possible with the available apertures.

When an active state of the arch wire is desired, the arch is first passed through one aperture in the mesially spaced tab 12 and the arch wire portion 28 is directed by a technician, e.g. with a pliers ripping the arch wire portion 28, into a selected aperture in the distally spaced tab 14. For this reason, the space between the tabs is advantageously left exposed and not covered so as to prevent gripping of an arch wire end portion 28 when it is situated between the two spaced halves. It is possible, however, to partially close the spaced by providing a guard 22 which prevents accumulation of food particles or other material between the spaced tabs, if this is desirable. The guard 22 should be so dimensioned so as not to interfere with the gripping of an arch wire portion disposed between the two tabs. When a guard 22 is provided, it also prevents breakage of the arch wire due to opposing occlusive forces.

Referring to FIGS. 4 and 5, two bicuspid teeth 40 are shown adjacent a first molar tooth 42. Brackets 44 are mounted on bands 46 on each of the bicuspid teeth 40. In FIG. 4, the buccal surface of the molar tooth 42 is shown inclined distolingually with respect to the arch wire 24. Assuming that this is the desired position of the molar tooth 42, it is then desirable that the arch wire 24 pass through the buccal end tube device 10 passively. This is accomplished by passing the arch wire through the apertures 16 and 20 so that the arch wire continues along a straight line when extended from the mesial portion of the arch adjacent the bicuspids 40. If, on the other hand, it were desired to rotate the molar tooth 42 in FIG. 4 distobuccally or mesiolingually, the arch wire 24 could be passed through the aperture 16 and 18, as described above.

In FIG. 5, the buccal surface of the molar tooth 42 is shown to be disposed substantially parallel to the arch wire 24 in the region of the bicuspids. Again, if this is the desired position of the molar tooth 42, then the arch wire is made to pass through the apertures 16 and 18. On the other hand, if it is desired to rotate the tooth distolingually, the arch wire can be passed through the apertures 16 and 20 by simply guiding the arch wire into the aperture 20 after it has been passed through the aperture 16. The flexibility of the end tube device 10 can be substantially enhanced by increasing the number of apertures in each of the tabs in the lingual or facial directions.

Referring to FIGS. 6 and 7, another embodiment of a buccal end tube device is shown. In FIG. 6, the device 50 comprises a welding flange 52. A substantially flat U-shaped strip has a transverse mounting portion 55 connected to the welding flange in two spaced apertured portions or tabs 54, 56 which are essentially normal to the plane defined by the mounting portion 55. As with the buccal end tube device 10, a plurality of apertures may be provided in either of the tabs 54, 56. In the device 50, the tab 54 is provided with a single aperture 58 while the tab 56 is provided with apertures 60, 62, 64 and 66. The aperture 60 is spaced facially from the aperture 66 while the aperture 62, 64 are spaced respectively above and below the aperture 66.

The operation of the device 50 insofar as the apertures 58, 60 and 66 are concerned is essentially the same as described with the buccal end tube device 10. The provision of apertures 62 and 64 permits the tipping of a tooth. Thus, when an arch wire passes through the aperture 58 and the aperture 62, the arch wire has a tendency to tip the tooth distally. On the other hand, passage of the arch wire through the apertures 58 and 64 normally tends to tip the tooth mesially.

In FIG. 7, the buccal end tube device 70 is provided with a welding flange 72 and two spaced aperture tabs 74 and 76. A mounting portion 75 extends between the tabs and is connected by conventional means to the welding flange 72. The tab 74 is provided with two spaced apertures 78, 80 while the tab 76 is provided with three spaced apertures 82, 84 and 86. Since all the tabs in the device 70 are essentially in a common plane with respect to the lingual or facial directions, the device 70 is most suitable for tipping corrective action. Otherwise, the operation of the buccal end tube devices 10, 50 and 70 are essentially the same.

Since buccal end tube devices are normally mounted on teeth which also support buccal tubes which accommodate extra-oral appliances, further flexibility of the end tube device in accordance with the present invention can be provided by forming a combination of an end tube buccal device and extra-oral buccal tube as shown in FIG. 8 and designed by the reference numeral 90. The combination device 90 has a pair of spaced welding flanges 92 to which is connected a welding flange 94 of the buccal end tube device similar to that described in connection with FIGS. 6 and 7. The edgewise device has spaced apertured tabs 96 and 98 — the tab 96 having apertures 100, 102, and 104 while the tab 98 has apertures 106, 108 and 110. Although the apertures on each tab are shown positioned along an arc adjacent the periphery of the rounded tabs, it should be clear from the above description that the apertures may be provided in any suitable locations to provide desired results. The more apertures which are provided on each of the tabs, the greater is the flexibility in which the arch wire 24 can be selectively oriented therethrough.

Also mounted on the welding flanges 92 is a buccal tube or extra-oral tube, as it is sometimes called, which has an aperture or opening 114 dimensioned to receive the extensions of an extra-oral appliance, facebow or night appliance.

In order to increase the number of possible orientations in which arch wires can be positioned, the buccal tube 112 is slotted, the slot 116 being disposed adjacent the buccal edgewise device welding flange 94. More particularly, the slot 116 advantageously extends between the tabs 96, 98 and communicates with the space defined between the tabs.

The aperture combination device shown in FIG. 8 are suitable for both tipping as well as rotation and several possible arch wire orientations are illustrated in both solid as well as dashed outlines. Of course, the total number of possible orientations depends on the number of possible combinations of apertures through which the arch wire may pass. This includes the slot 116 which may be used, for practical purposes, as another aperture so that an arch wire may pass through one tab and, instead of passing through the other tab, may pass through the slot 116 as shown in dashed outline in FIG. 8. The utilization of a slot 116 essentially enhances the flexibility insofar as the device 90 is utilized for tipping purposes. However, by providing further slots in the buccal tube 112 spaced more in the facial direction, those slots can simultaneously be utilized for purposes of rotating a tooth.

Although the apertures have been shown square, it should be clear that round apertures may equally be used. The specific construction or peripheral configurations of the tabs are not critical for purposes of the present invention. Any manufacturing technique which is economical can be used, e.g. punching the devices from sheet metal and bending the ends thereof to form the spaced tabs.

Numerous alterations of the structure herein disclosed will suggest themselves to those skilled in the art. However, it is to be understood that the present disclosure relates to a preferred embodiment of the present invention which is for purposes of illustration only and is not to be construed as a limitation of the invention.

What is claimed is:

1. A buccal end tube device for selectively orienting and orthodontic arch wire relative to a tooth, the device comprising two spaced tabs, each of said tabs being provided with arch wire positioning means in the form of at least one aperture, [ said] at least one [ apertures in] *of said tabs having at least two apertures* [ said tabs being ] spaced from each other in the buccal-lingual direction [ and], *said tabs being* adapted to receive spaced portions of the arch wire, whereby the arch wire may be disposed in a predetermined orientation within a buccal-lingual plane by positioning the arch wire in said at least one aperture in each of said two spaced tabs and maintained in the selected orientation against the action of external forces applied both to the arch wire and to the buccal end tube device.

2. A buccal end tube device as defined in claim 1, wherein one of said tabs is provided with one aperture, and wherein the other tab is provided with two spaced apertures.

3. A buccal end tube device as defined in claim 1, wherein said tabs are spaced from one another, and further comprising connecting means extending between said tabs for fixing the spaced relationship between the latter.

4. A buccal end tube device as defined in claim 3, wherein said connecting means comprises a substantially flat strip adapted to be connected to an associated tooth.

5. A buccal end tube as defined in claim 4, wherein ach tab projects from said flat strip in a direction substantially normal to the latter.

6. A buccal end tube device as defined in claim 2, wherein two apertures, one in each of said respective tabs, are aligned with each other along a first line directed along a predetermined direction relative to an associated tooth, while another aperture in said other flat tab is aligned with said one aperture in said one flat tab along a second line inclined relative to said predetermined direction, whereby an arch wire may be selectively passed through said apertures to selectively orient the arch wire relative to a tooth.

7. A buccal end tube device as defined in claim 1, further comprising a substantially flat mounting strip extending between said tabs, each of said tabs extending substantially normally from said mounting strip.

8. A buccal end tube device as defined in claim 7, wherein a plurality of apertures are provided in each of said tabs, at least two apertures, one in each tab, being aligned with each other along a line substantially parallel to said flat strip.

9. A buccal end tube device as defined in claim 7, wherein said apertures are rectangular in configuration.

10. A buccal end tube device as defined in claim 7, wherein said flat strip is curved to correspond to the curvature of an associated tooth on which said strip is mounted.

11. A buccal end tube device as defined in claim 1, wherein one tab is arranged to normally first receive the arch wire in an aperture thereof, and another tab is arranged to normally receive the arch wire in an aperture thereof subsequently to the latter having been received in said one tab, said apertures in said other tab facing said one tab being provided with tapered portions, whereby location and entry of the arch wire into one of the apertures of said other tab is facilitated.

12. A buccal end tube device as defined in claim 1, wherein each of said apertures has an end portion normally first approached by an arch wire successively passing through said respective apertures, each of said apertures being provided with tapered portions at said end portions, whereby location and entry of the arch wire into said apertures is facilitated.

13. A buccal end tube device as defined in claim 1, wherein said apertures are provided at each end thereof with tapered portions, whereby location and entry of the arch wire into one of the apertures of each of said tabs is facilitated irrespective of the order of successive entry of the arch wire into said tabs.

14. A buccal end tube device comprising a substantially flat U-shaped strip having a transverse mounting portion defining one plane and two spaced apertured portions defining substantially parallel planes substantially normal to the plane defined by said mounting portion, one of said apertured portions being provided with at least one aperture while the other of said apertured portions being provided with at least two spaced apertures, at least two apertures, one in each respective apertured portion, being aligned with the other along a line substantially parallel with said mounting portion, while another aperture in said other portion being aligned with an aperture in said one portion along a line inclined at a predetermined angle to said mounting portion, whereby an arch wire may be passed selectively through said aperture to orient the arch wire either parallel or at an incline to said mounting portion; and an extra-oral end tube mounted on said welding flange adjacent to said flat U-shaped strip, said tube having an axis substantially parallel to said mounting portion.

15. A buccal end tube device as defined in claim 14, further comprising a welding flange connected to said mounting portion, said welding flange being configurated to conform to a tooth on which the buccal end tube device is to be mounted.

16. A buccal end tube device as defined in claim 14, wherein a portion of the periphery of said tube is disposed adjacent to said flat U-shaped strip and is provided with a longitudinal slot substantially extending the length between said two spaced apertures portions, said slot being arranged to receive an arch wire which passes through only one of said apertured portions, whereby said slot in said extra-oral device can be utilized in place of one of said apertured portions.

17. A buccal end tube device for selectively orienting an orthodonic arch wire relative to a tooth, the device comprising two spaced tabs, each of said tabs being provided with arch wire positioning means in the form of at least one aperture, said at least one aperture being adapted to receive spaced portions of the arch wire, whereby the arch wire may be selectively oriented by positioning the arch wire in said at least one aperture in each of said two spaced tabs and maintained in the selected orientation against the action of external forces applied both to the arch wire and to the buccal end tube device; and guard means disposed on one side of said tabs for preventing accumulation of material in the space between the latter.

18. A buccal end tube device for selectively orienting an orthodontic arch wire relative to a tooth, the device comprising two spaced substantially flat tabs, each of said tabs being provided with arch wire positioning means in the form of at least one aperture, at least two apertures being provided in one of said tabs spaced from each in a buccal-lingual direction when mounted on a tooth, said apertures being adapted to receive spaced portions of the arch wire in one of two general orientations in a buccal-lingual plane, whereby the arch wire may be selectively oriented in the buccal-lingual plane by positioning the arch wire portions in selected ones of said apertures and maintained in the desired orientation against the action of external forces applied both to the arch wire and to the buccal end tube device.

*19. A buccal end tube device for selectively orienting an orthodontic arch wire relative to a tooth, the device comprising two spaced arch wire positoning means, one of said arch wire positioning means defining at least one arch wire receiving aperture and the other of said arch wire positioning means defining at least two arch wire receiving apertures which are spaced from each other in the buccal-lingual direction, said two arch wire positioning means being adapted to receive spaced portions of the arch wire is selected arch wire receiving apertures, whereby the arch wire may be disposed in a selected one of a plurality of orientations within a buccal-lingual plane by positioning the arch wire in selected ones of said arch wire receiving apertures of said spaced arch wire positioning means and maintained in said selected orientation against the action of external forces applied both to the arch wire and to the buccal end tube device.*

*20. A buccal end tube device as defined in claim 19, wherein said apertures are provided at each end thereof with tapered portions, whereby location and entry of the arch wire into one of the apertures of each of said arch wire positioning means is facilitated irrespective of the order of successive entry of the arch wire into said apertures of said arch wire positioning means.*

*21. A buccal end tube device as defined in claim 19 wherein each of said arch wire positioning means defines at least two arch wire receiving apertures, the apertures of each arch wire positioning means being spaced from each other in the buccal-lingual direction.*

*22. A buccal end tube device for selectively orienting an orthodontic arch wire relative to a tooth, the device comprising two spaced arch wire positioning means, each of said arch wire positioning means defining at least one aperture, said at least one aperture being adapted to receive spaced portions of the arch wire, whereby the arch wire may be selectively oriented by positioning the arch wire in said at least one aperture in each of said two spaced arch wire positioning means and maintained in the selected orientation against the action of external forces applied both to the arch wire and to the buccal end*

*tube device; and guard means disposed on one side of said arch wire positioning means for preventing accumulation of material in the space between said arch wire positioning means.*

*23. A buccal end tube device as defined in claim 22 wherein at least one of said arch wire positioning means defines at least two arch wire receiving apertures which are spaced from each other in the buccal-lingual direction.*

* * * * *

UNITED STATES PATENT OFFICE
CERTIFICATE OF CORRECTION

PATENT NO. : Reissue 28,962
DATED : September 14, 1976
INVENTOR(S) : Melvin WALLSHEIN It is certified that error appears in the above-identified patent and that said Letters Patent are hereby corrected as shown below:

Column 8, line 31, before "orthodontic" change "and" to --an--;

Column 10, line 42, after "arch wire" change "positoning" to --positioning--.

Signed and Sealed this
Fourth Day of January 1977

[SEAL]

*Attest:*

RUTH C. MASON
*Attesting Officer*

C. MARSHALL DANN
*Commissioner of Patents and Trademarks*